(12) United States Patent
Nakagawa et al.

(10) Patent No.: US 7,357,724 B2
(45) Date of Patent: Apr. 15, 2008

(54) CONSTANT VELOCITY JOINT

(75) Inventors: Tohru Nakagawa, Shizuoka-ken (JP); Kazuhiro Azuma, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 190 days.

(21) Appl. No.: 11/130,395

(22) Filed: May 17, 2005

(65) Prior Publication Data
US 2005/0272510 A1 Dec. 8, 2005

(30) Foreign Application Priority Data
May 24, 2004 (JP) ............................ 2004-153909
May 24, 2004 (JP) ............................ 2004-153922

(51) Int. Cl.
F16D 3/224 (2006.01)
(52) U.S. Cl. ...................... 464/145; 464/906
(58) Field of Classification Search ............... 464/145, 464/146, 906
See application file for complete search history.

(56) References Cited
U.S. PATENT DOCUMENTS 5,290,203 A * 3/1994 Krude ........................ 464/145
6,120,382 A * 9/2000 Sone et al. .................. 464/145
7,025,684 B2 * 4/2006 Frana et al. ................. 464/145
2001/0024976 A1 * 9/2001 Ouchi et al. ................. 464/145
2003/0017877 A1 * 1/2003 Kobayashi et al. .......... 464/145

* cited by examiner

Primary Examiner—Greg Binda
(74) Attorney, Agent, or Firm—Arent Fox, LLP

(57) ABSTRACT

A constant velocity joint 1 disposed on the outboard side of a drive axle for transmitting drive power to a wheel, comprising an outer joint member 2 having a plurality of track grooves 3 on the spherical inner peripheral surface 2a, an inner joint member 4 having a plurality of track grooves 5 on the spherical outer peripheral surface 4a, torque transmitting balls 6 disposed in a plurality of ball tracks formed by the opposed track grooves 3 and 5 of both joint members 2 and 4, and a cage 8 interposed between both joint members 2 and 4 and receiving and holding the torque transmitting balls 6 in pockets 7, wherein the outboard-side end of the cage 8 is formed with an opening 8x for removably inserting the inner joint member 4 and the inboard-side end is formed with an opening 8y whose diameter is smaller than that of the outboard-side opening 8x.

23 Claims, 9 Drawing Sheets

CONSTANT VELOCITY JOINT

BACKGROUND OF THE INVENTION

1. Field of the Invention

The present invention relates to a constant velocity joint, particularly to a constant velocity joint disposed on the outboard side of a drive axle for transmitting drive power to a wheel.

2. Description of the Prior Art

As is known in the art, in automobiles and other various vehicles similar thereto, constant velocity joints capable of transmitting rotational power at constant velocity even when there is an angular or axial displacement between two shafts have been installed in a power transmission path for transmission of drive power from the engine to a wheel. As an example of a vehicle having such power transmission path, a so-called ATV (All Terrain Vehicle, also called a four-wheeled buggy car) which is an uneven terrain traversing, four-wheeled or three-wheeled mounted type vehicle, equipped with balloon tires and designed to freely traverse wastelands, sandy beaches and the like has come to be widely known.

The power transmission device for these various vehicles will be explained with said ATV used as a representative example. As conceptually shown in FIG. 6, the power from an engine 21 is outputted from the output shafts on the front and rear sides via a speed change mechanism in the interior and is inputted to differential gears 24 and 25 on the front and rear sides via power transmission means 22 and 23, such as chains or propeller shafts. And, the engine power inputted to the differential gears 24 and 25 is reduced in speed by the mechanism of the differential gears 24 and 25 and is converted to a rotational power orthogonal thereto, whereupon it is transmitted to the wheels 28 and 29 through left and right drive axles 26 and 27. In the example shown in the same figure, constant velocity joints are used for joints A between the drive shaft 26 on the front side and the differential gear 24 and for joints B in the wheels 28. In addition, there are cases where constant velocity joints are used for joints C between the drive axle 27 on the rear side and the differential gear 25 and for joints D in the wheels 29.

FIG. 7 shows the drive axle 26 on the front side. In order to allow the drive axle 26 to make angular displacement and axial displacement following the movement of the wheel 28 during cornering, traversing uneven terrains or the like movement, a slide type constant velocity joint (a constant velocity joint allowing angular displacement and axial displacement between two shafts) 30 and a fixed type constant velocity joint (a constant velocity joint allowing angular displacement between two shafts) 31 are used in pair for joining the drive axle 26. In the example shown in the same figure, one end (on the inboard side) of the drive axle 26 is joined to the differential gear 24 (at the joint A) through the slide type constant velocity joint (a double offset type constant velocity joint, hereinafter referred to as "DOJ") 30, while the other end (the outboard side) of the drive axle 26 is joined to the wheel 28 (at the joint B) through a fixed type constant velocity joint (Rzeppa type constant velocity joint: ball fixed joint, hereinafter referred to as "BJ") 31.

Heretofore, as said DOJ and BJ for vehicles such as ATVs, those for passenger cars have been frequently converted to be used as such. In vehicles small in size and narrow in width, such as ATVs, however, it is suitable to use a drive axle which is light-weight and compact and which has satisfactory operability. To meet such demand, Japanese Patent Laid-Open 2001-97063, for example, discloses the use of a double offset type constant velocity joint (DOJ) on the inboard side and an undercut free type constant velocity joint (hereinafter referred to as "UJ") on the outboard side, in a drive axle for transmitting drive power to wheel through constant velocity joints on the inboard and outboard sides.

The UJ disposed on the outboard side of this drive axle, basically, as shown in FIG. 8, comprises an outer joint member 12 with a spherical inner peripheral surface 12a formed with a plurality of track grooves 13, an inner joint member 14 with a spherical outer peripheral surface 14a formed with a plurality of track grooves 15, a plurality of torque transmitting balls 16 disposed in ball tracks formed by the opposed track grooves 13 and 15 of both joint members 12 and 14, and a cage 18 interposed between both joint members 12 and 14 and formed with pockets 17 holding the plurality of torque transmitting balls 16. In consideration of the inner joint member 14 being incorporated in the cage 18, the cage 18 is internally formed at one end thereof with an opening 8x having a relatively large diameter for removably inserting the inner joint member 14 and at the other end thereof with an opening 18y having a relatively small diameter with such a value that the inner joint member 4 cannot be removably inserted in the cage 18.

In this case, the directivity of incorporation of the cage 18 is such that because of the demand for suppressing wear on and damage to the contact surfaces and for suppressing generation of heat and the like by increasing the area of contact between the inner joint member 14 on the outboard side (left side in the same figure) and the cage 18, which contact occurs during torque loading, so as to reduce the contact surface pressure, as shown in the same figure, it has been set that the opening 18x having a large diameter is disposed at the end of the inboard side (right side in the same figure). Specifically, with consideration given to the incorporatability of the outer joint member 12, cage 18 and inner joint member 14, and to decreases in durability and the like due to generation of heat, it is advantageous to position the large diameter opening 18x at the end of the cage 18 on the inboard side. Therefore, it has been common practice that the area of contact of the cage 18 with the inner and outer joint members 14 and 12 (particularly the area of contact of the cage 18 with the inner joint member 14) is large on the outboard side. With such matter taken into consideration, the direction of incorporation of the cage 18 has been set as described above.

On the other hand, the inner periphery of said inner joint member 14 is formed with serrations 14c (or splines) used for joining to an intermediate shaft 9 serving as the shaft member (see FIG. 7). Therefore, in this type of constant velocity joint (UJ), the dimensions or dimensional ratios of various constituent elements from the outer peripheral surface of the outer joint member 12 to the intermediate shaft 9 (serrations 14c) are very important, and these design values determine whether the strength and performance of the UJ are good or bad.

However, such vehicle as an ATV does not make a long-distance travel as in the case of passenger cars, and about half of the durability (life) of constant velocity joints for passenger cars is sufficient for constant velocity joints (UJs) as considered from balance between market performance and the term of guarantee. Despite this, considered on the basis of passenger car specifications as they are, there is a feeling of excessive quality. Further, as to the frequency of use, about half for passenger car specifications is sufficient as considered from balance with vehicle speed, and the same may be said. Therefore, even if the area of contact of the cage 18 particularly with the inner joint member 14 is not made as large as that for passenger cars, on the outboard side, sufficient durability is obtained. Therefore, there is also a feeling of excessive quality in establishing said state of contact of the cage 18.

In contrast therewith, the inboard side of the cage 18 is constantly subjected to a force from the torque transmitting balls 16. In other words, the force with which the torque transmitting balls 16 tend to jump out to the inboard side is supported by the inboard-side end periphery of the cage 18; therefore, it follows that a large pressing force from the torque transmitting balls 16 acts on the inboard-side end periphery of the cage 18. Despite this, if the large diameter opening 18x in the cage 18 is positioned at the inboard-side end as described above, this will lead to a shortage of strength due to less material in the inboard-side end periphery of the cage 18, forming a cause of damage or breakage to the cage 18.

Furthermore, of the constituent elements of UJ, that which influences most strongly is the cage 18. That is, despite the fact that the cage 18 cannot secure a larger (excessive) axial width, it is necessary to form six or eight pockets 17 for receiving and holding torque transmitting balls 16 having a sufficient diameter. Furthermore, during torque loading, a large pressing force from the torque transmitting balls 16 acts on the material in the periphery of each of the pockets 17 of the cage 18. Therefore, even in the case of short-term use of the UJ, cracks or damage occurs in the material between the pockets 17 of the cage 18 and on the material on axial opposite sides of each pocket 17, resulting in a decrease in the strength of the UJ.

It is only natural that increasing the material thickness of the cage 18 is effective in avoiding breakage to such cage 18. However, simply increasing the material thickness of the cage 18 makes it inevitable, for example, to shallow the track grooves 13 of the outer joint member 12 or the track grooves 15 of the inner joint member 14, thus increasing the percentage of risk of the torque transmitting balls 16 running up onto the shoulder. Specifically, in the conventional UJ shown in FIG. 9, the material thickness T1a of the cage 18 is thin, so that the track groove 13 of the outer joint member 12 and the track groove 15 of the inner joint member 14 are made sufficiently deep to make it possible to increase the contact angles αa and βa of the torque transmitting balls 16 with respect to these track grooves 13 and 15. However, in the case where the material thickness of the cage 18 is increased from such state, if the contact angles αa and βa are the same, the percentage of risk of the torque transmitting balls 16 running up onto the shoulder increases by the amount by which the track grooves 13 and 15 are shallowed.

And, since the outer and inner joint members 12 and 14 and the torque transmitting balls 16 have a very low probability of being damaged or broken, as compared with the cage 18, there is a feeling of excessive quality concerning the ratio of dimensions of their material thickness, diameter, etc. For this reason, it can hardly be said that the size and weight reductions of the UJ have been fully attained in relation to the intermediate shaft 9 serving as the shaft member. With the above taken into consideration, the strength of the cage 18 is improved and then excessive quality of the outer and inner joint members 12 and 14 and torque transmitting balls 16 is avoided to attain relative size and weight reductions of the UJ in connection with the shaft member. To attain this, the problem is to how to set the ratio of the dimensions of constituent elements so as to obtain the best result.

SUMMARY OF THE INVENTION

The invention, which has been achieved with the above in mind, has a first problem to avoid excessive quality with respect to contact wear, etc., on the outboard side of the cage so as to avoid waste, and then improve the strength of the cage against the pressing force from the torque transmitting balls on the inboard side and accordingly to avoid damage or breakage to the cage. Further, a second problem is to avoid excessive quality of those constituent elements of an UJ which have a low probability of being damaged or broken while sacrificing their durability, and to give consideration so as to fully secure strength for the cage having a high probability of being damaged or broken, thereby attaining size and weight reductions of the UJ.

The invention made in order to solve said first problem (the first technical means) provides a constant velocity joint comprising an outer joint member disposed on the outboard side of a drive axle for transmitting drive power to wheel and having a plurality of track grooves in the spherical inner peripheral surface, an inner joint member having a plurality of track grooves in the spherical outer peripheral surface, torque transmitting balls disposed in a plurality of ball tracks formed by the opposed track grooves of both joint members, and a cage interposed between both joint members and receiving and holding said torque transmitting balls in a plurality of window-shaped pockets, said constant velocity joint being characterized in that the outboard-side end of said cage is formed with an opening for removably inserting said inner joint member and the inboard-side end is formed with an opening having a smaller diameter than that of the opening on the outboard side.

With such arrangement, in the case where torque is loaded, the outer joint member and the cage contact with each other at their inboard-side spherical surfaces, while the inner joint member and the cage contact with each other at their outboard-side spherical surfaces. Even in such case, said technical means can provide the following effects. That is, since the outboard-side end of the cage is formed with an opening having a relatively large diameter for removably inserting he inner joint member, the area of contact of the cage with the inner joint member is small on the outboard side, so that the contact pressure increases. Considering the fact that there remains room for preventing the durability of the contact surfaces against wear or the like from unreasonably decreasing, it becomes possible to secure a suitable degree of durability to suppress excessive quality with respect to contact wear, etc., on the outboard side of the cage. Furthermore, since the inboard-side end of the cage is formed with an opening having a smaller diameter than that of the opening on the outboard side, the amount of material around the inboard-side end can be made sufficient to increase the strength against the pressing force from the torque transmitting balls, thus making it possible to avoid damage and breakage to the cage.

In the above arrangement, the outer peripheral surface of the cage is a spherical surface substantially over the entire region, while its inner peripheral surface may be such that the surface continuous with the spherical surface of the axial central region is a cylindrical surface on the outboard side and is a spherical surface on the inboard side.

With the arrangement thus made, it follows that the inner peripheral surface of the outboard-side area of the cage is formed with a cylindrical surface continuous with the spherical surface of the widthwise central region, so that the diameter of the opening in the outboard-side end can be efficiently increased and the inner joint member can be wastelessly and smoothly removably inserted in the cage through the cylindrical surface. Further, since it follows that the inner peripheral surface of the inboard-side area of the cage is formed with a spherical surface continuous with the spherical surface of the widthwise central region, it is possible to form the material section of the cage over a long region extending along the spherical outer peripheral surface of the inner joint member, thus making it possible to make the amount of the material section around the inboard-side end sufficient.

In the above arrangement, the inboard-side end of the cage may project from the inboard-side end of the outer joint member, in the state of the working angle being 0°.

With the arrangement thus made, the widthwise dimension of the cage can be made relatively large, so that material sections having a sufficient width can be secured on widthwise opposite sides of the pockets of the cage, making it possible to further improve the strength of the cage.

In the above arrangement, the window-shaped pockets of the cage may be all the same in size.

That is, in the prior art, in incorporating the inner joint member, for example, into the cage, convex portions each between adjacent track grooves of the inner joint member are inserted in the pockets of the cage, and in this state, the incorporation is effected. When such technique is employed, this leads to a situation in which the particular pockets used for insertion of the convex portions have to be made larger than the other pockets. In the case where such incorporation technique is not employed, all pockets can be made the same in size without making them unreasonably large, and it becomes possible to prevent a local decrease in the strength of the cage.

In the above arrangement, the constant velocity joint may be of the undercut free type.

With the arrangement thus made, the situation becomes extremely advantageous in making size and weight reductions of the constant velocity joint and also the drive axle.

A drive axle having a constant velocity joint having the above arrangement may be installed in an uneven terrain traversing, mounted type vehicle (ATV).

With the arrangement thus made, the effect particularly required of ATVs, that is, the effect of suppressing excessive quality with respect to contact wear, etc., on the outboard side of the cage, and the effect of improving the strength around the periphery of the inboard-side end, can be remarkably obtained.

On the other hand, the invention made in order to solve said second problem (the second technical means) provides an undercut free type constant velocity joint comprising an outer joint member disposed on the outboard side of a drive axle for transmitting drive power to a wheel and having a plurality of track grooves in the spherical inner peripheral surface, an inner joint member having a plurality of track grooves in the spherical outer peripheral surface, torque transmitting balls disposed in a plurality of ball tracks formed by the opposed track grooves of both joint members, and a cage interposed between both joint members and receiving and holding said torque transmitting balls in a plurality of window-shaped pockets, said constant velocity joint being characterized in that dw/dv is set at 3.3-3.6, where dw is the diameter of the outer peripheral surface of said outer joint member and dv is the PCD of serrations or splines formed on the inner periphery of said inner joint member and used for joining to a shaft member.

According to such arrangement, the value of dw/dv becomes smaller than the conventional value (about 3.7), so that the region extending from the outer peripheral surface of the outer joint member to the inner peripheral end (serrations or splines) of the inner joint member becomes relatively narrow as compared with the prior art, making it possible to achieve relative size reduction of an UJ in connection with the shaft member to be joined to the inner periphery of the inner joint member. That is, even when a design concept is employed in which the outer and inner joint members and torque transmitting balls are selectively suitably made smaller in size to avoid their excessive quality at the sacrifice of their durability, so as to make the material thickness of the cage greater than in the prior art to improve the strength, it follows that relative size and weight reductions can be made for the UJ as a whole in relation to said shaft member.

In the arrangement of the second technical means, T1/d1 may be set at 0.33-0.35, where T1 is the material thickness of the cage and d1 is the diameter of the torque transmitting balls.

With the arrangement thus made, the value of t1/d1 becomes greater than the conventional value (about 0.25), so that the material thickness of the cage becomes relatively great in relation to the diameter of the torque transmitting balls, whereby even in the case where a pressing force from the torque transmitting balls acts on the peripheral material portion around each of the pockets of the cage, the drawback that cracks or damage occurs in the material section between adjacent pockets of the cage or the material sections on axially opposite sides of each pocket becomes less liable to occur, so that the strength of the cage and also the strength of the UJ are effectively improved.

In the arrangement connected with the second technical means, the contact angle $\alpha$ of the track grooves of the outer joint member with respect to the torque transmitting balls and the contact angle $\beta$ of the track grooves of the inner joint member with respect to the torque transmitting balls may be set so that both are 31.5°-38.5°. In addition, these contact angles $\alpha$ and $\beta$ may be set so that both are 35°.

With the arrangement thus made, even in the case where each of the track grooves of the outer and inner joint members become shallow due to increasing the material thickness of the cage, the fact that the contact angles $\alpha$ and $\beta$ of the torque transmitting balls with respect to the track grooves are small as compared with the conventional angles (40°-45°) makes it possible to suppress an increase in the percentage of risk of the torque transmitting ball running up onto the shoulder.

In the arrangement connected with the second technical means, the inboard-side end of the cage may project from the inboard-side end of the outer joint member, in the state of the working angle being 0°.

With the arrangement thus made, the widthwise dimension of the cage can be made relatively large, so that material sections having a sufficient width can be secured on widthwise opposite sides of the pockets of the cage; thus, coupled with the dimensional ratio of various sections being made suitable, this makes it possible to improve the strength of the cage.

In the arrangement connected with the second technical means, the plurality of window-shaped pockets of the cage may be all the same in size.

That is, in the prior art, in incorporating the inner joint member, for example, into the cage, convex portions each between adjacent track grooves of the inner joint member are inserted in the pockets of the cage, and in this state, the incorporation is effected. When such technique is employed, this leads to a situation in which the particular pockets used for insertion of the convex portions have to be made larger than the other pockets. In the case where such incorporation technique is not employed, all pockets can be made the same in size without making them unreasonably large. Therefore, it is possible to prevent a local decrease in the strength of the cage; thus, coupled with the dimensional ratio of various sections being made suitable as described above, this makes it possible to further improve the strength of the cage.

A constant velocity joint having such arrangement connected with the second technical means may be installed in uneven terrain traversing, mounted type vehicles (ATVs).

As described above, according to the invention (the first technical means), for the outboard side of the cage, a suitable degree of durability can be secured to suppress excessive quality with respect to contact wear, etc., and for the inboard side, the strength against a pressing force from the torque transmitting balls can be increased, with the result that it becomes possible to avoid damage or breakage to the cage. Further, according to the invention (the second technical means), dw/dv is set at 3.3-3.6, where dw is the diameter of the outer peripheral surface of said outer joint member and dv is the PCD of serrations or splines formed on the inner peripheral end of said inner joint member. Therefore, the value of dw/dv becomes smaller than the conventional value (about 3.7), so that the region extending from the outer peripheral surface of the outer joint member to the inner peripheral end of the inner joint member becomes relatively narrow as compared with the prior art. Thus, even when a design concept is employed in which the outer and inner joint members and torque transmitting balls are selectively suitably made smaller in size to avoid their excessive quality at the sacrifice of their durability, so as to make the material thickness of the cage greater than in the prior art to improve the strength, it becomes possible to achieve relative size and weigh reductions for the UJ as a whole in relation to said shaft member.

DESCRIPTION OF THE PREFERRED EMBODIMENTS

Figure 6:
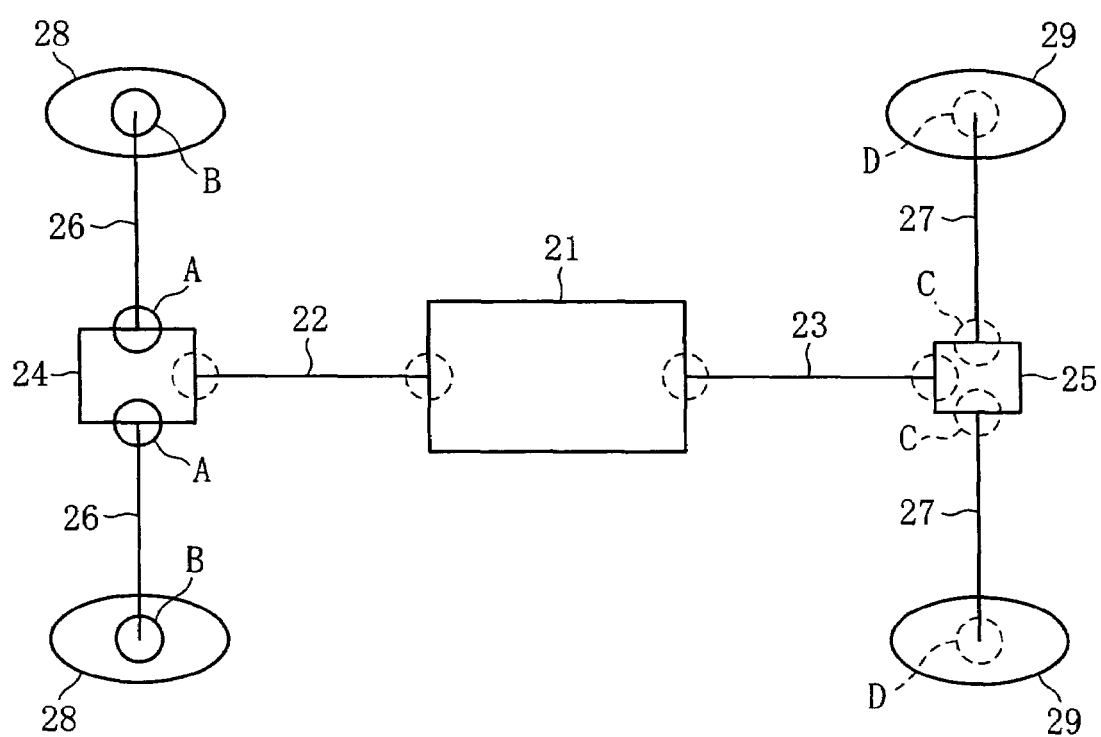
FIG. 6 is a schematic front view of the power transmission device of a vehicle (for example, an ATV) equipped with constant velocity joints according to the first embodiment of the invention and the second embodiments, showing an existing power transmission device.
Figure 7:
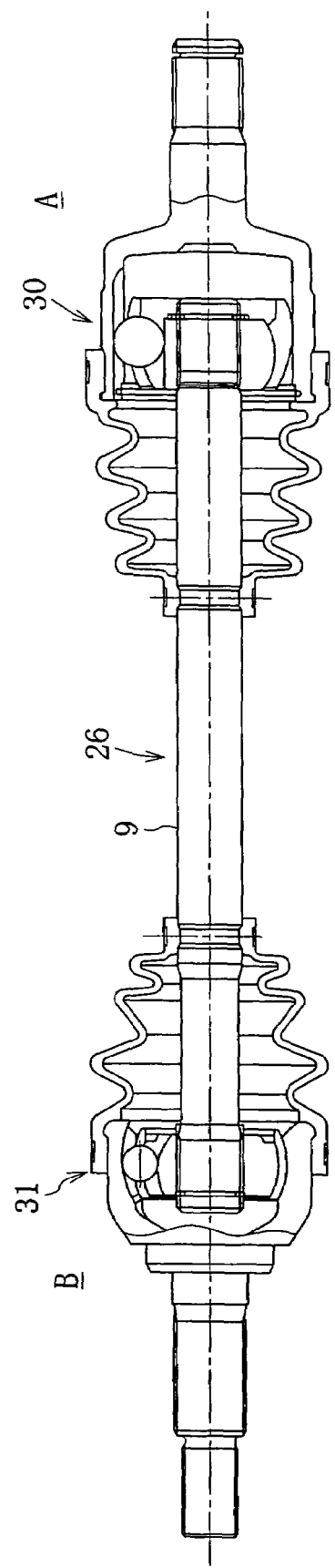
FIG. 7 is a principal front view, partly broken, of a drive axle having a constant velocity joint according to the first embodiment of the invention and the second embodiments at one axial end thereof, showing conventionally existing one.
Figure 8:
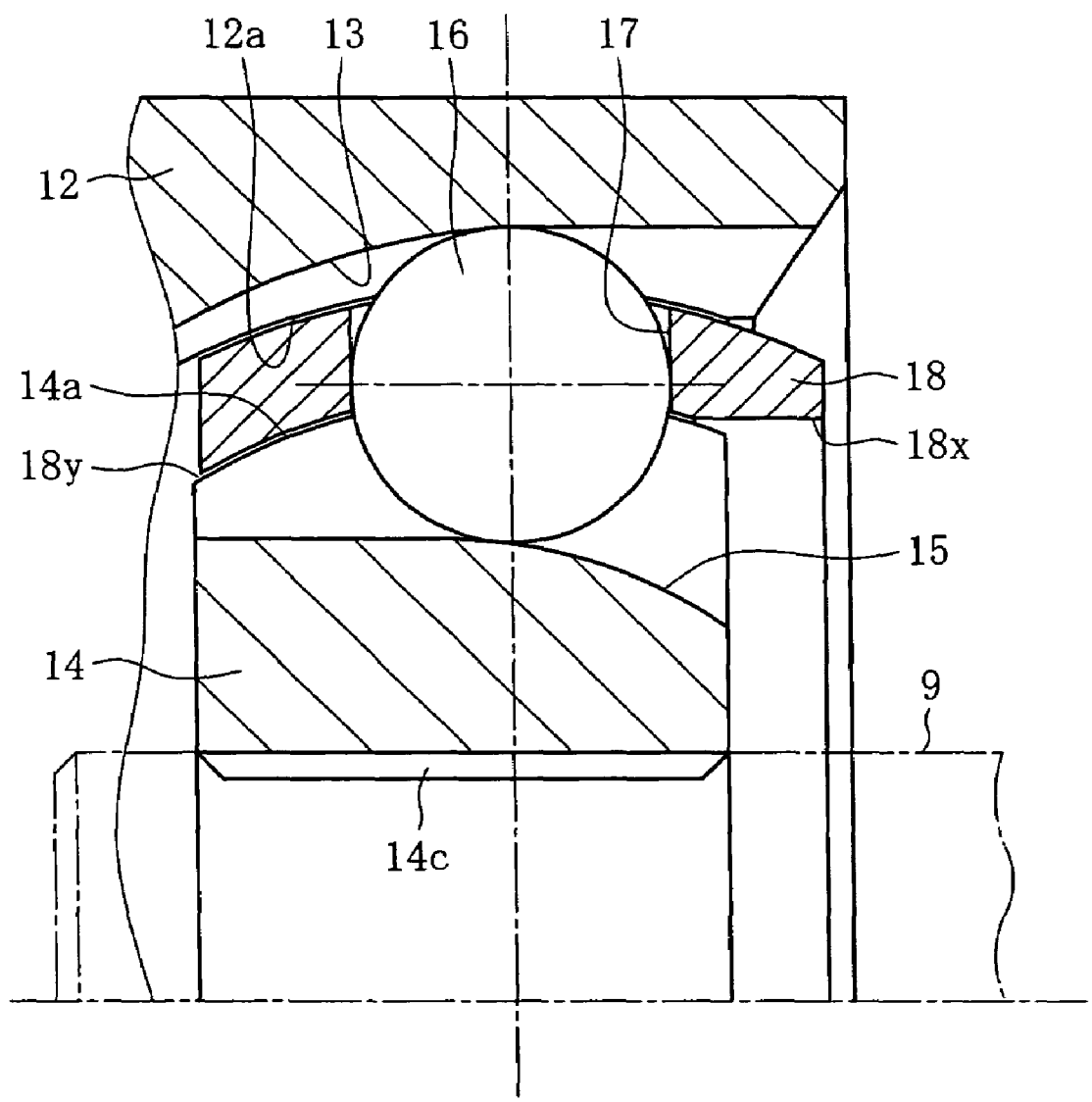
FIG. 8 is a principal front view in longitudinal section, showing a conventional constant velocity joint.
Figure 9:
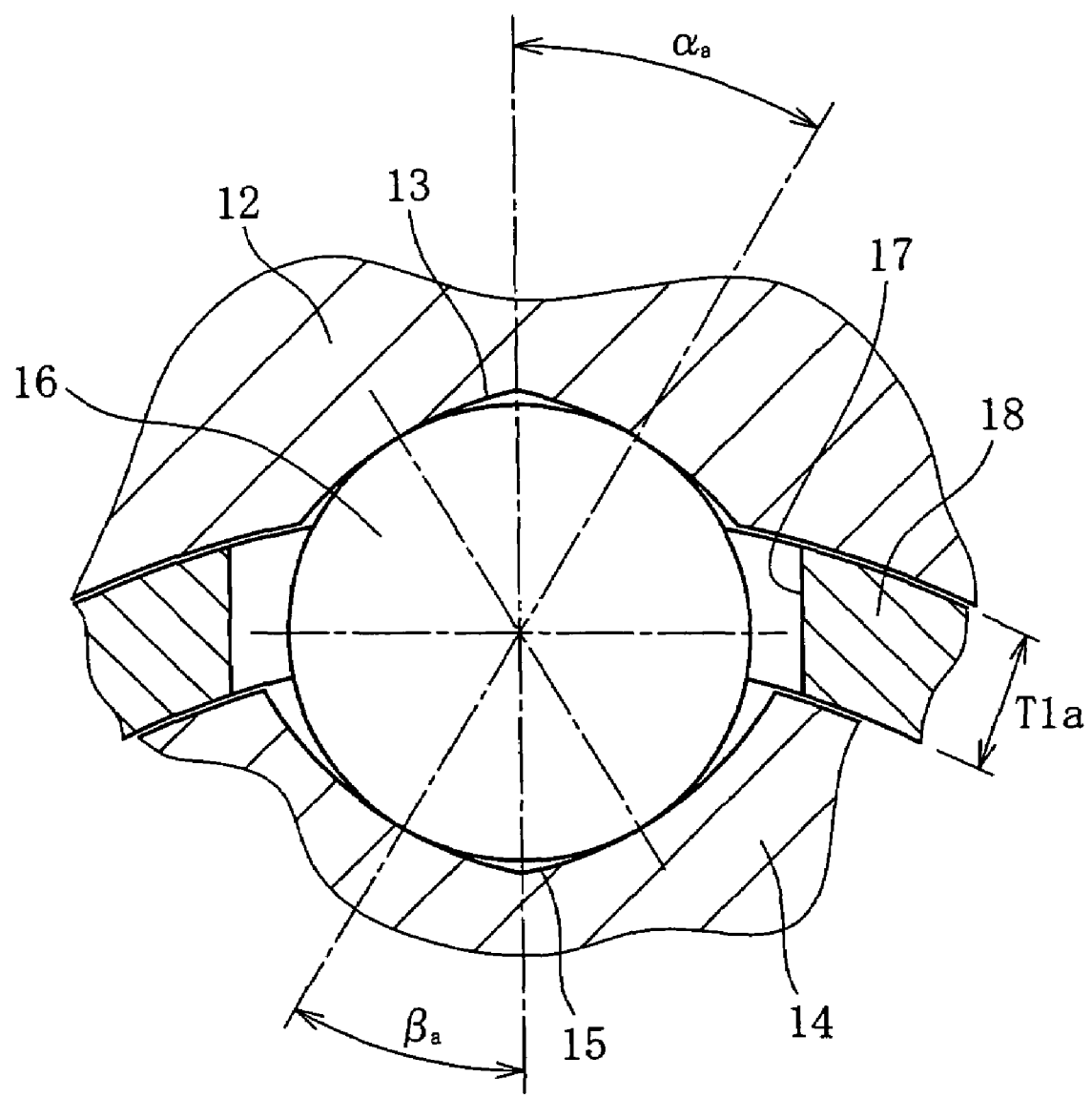
FIG. 9 is a principal enlarged side view in longitudinal section, showing the conventional constant velocity joint.

The embodiments of the invention will now be described with reference to the drawing. In addition, a constant velocity joint according to an embodiment of the invention is the one disposed on the outboard side of the drive axle 26 (27) described on the basis of FIG. 6, while the drive axle is the one, already described with reference to FIG. 7, disposed on the front side (or it may be on the rear side). Therefore, only the constant velocity joint and its peripheral devices will be described hereinafter.

Figure 1:
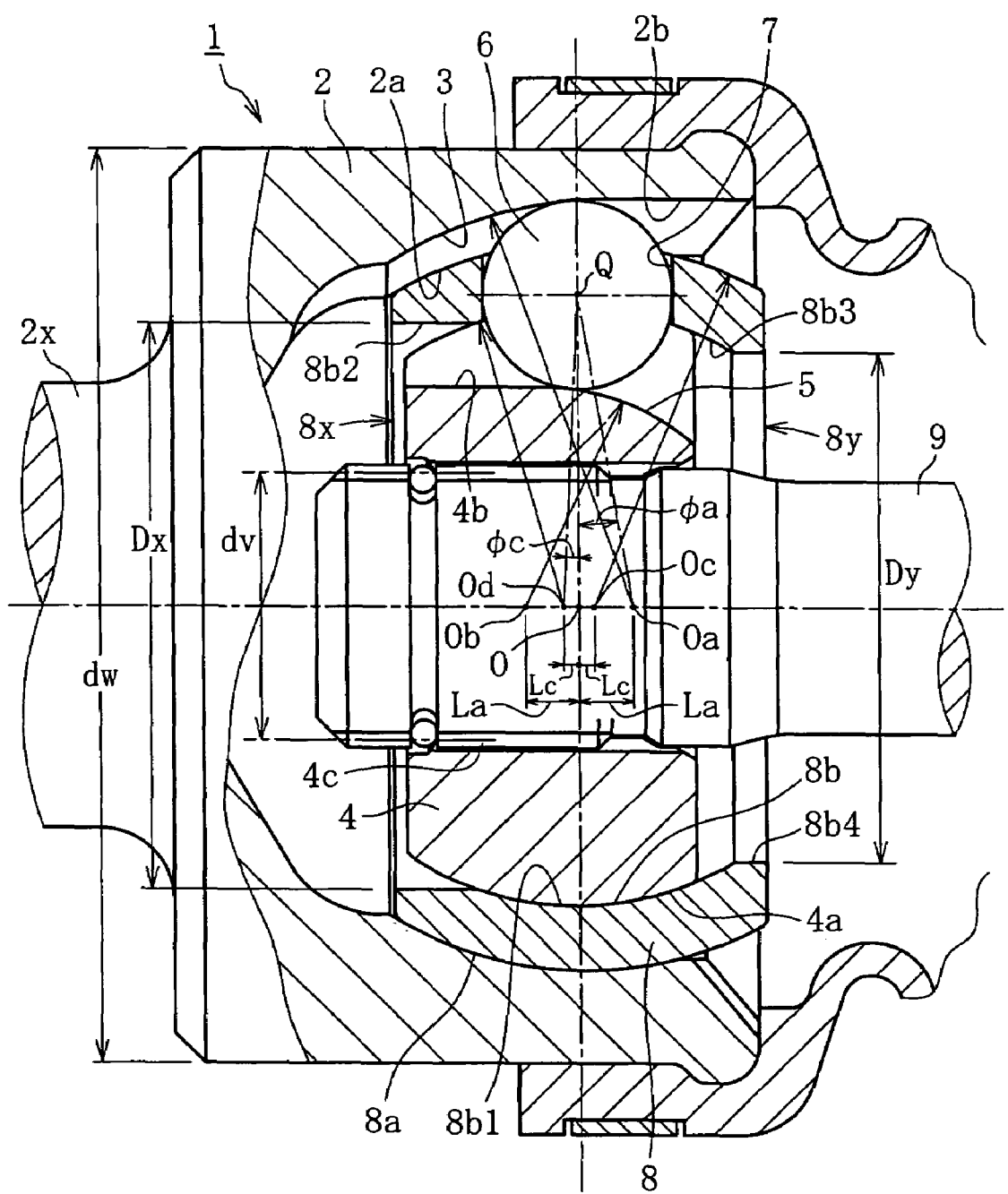
FIG. 1 is a principal front view in longitudinal section, showing a state assumed when a constant velocity joint according to a first embodiment of the invention takes a working angle of 0°.
Figure 2:
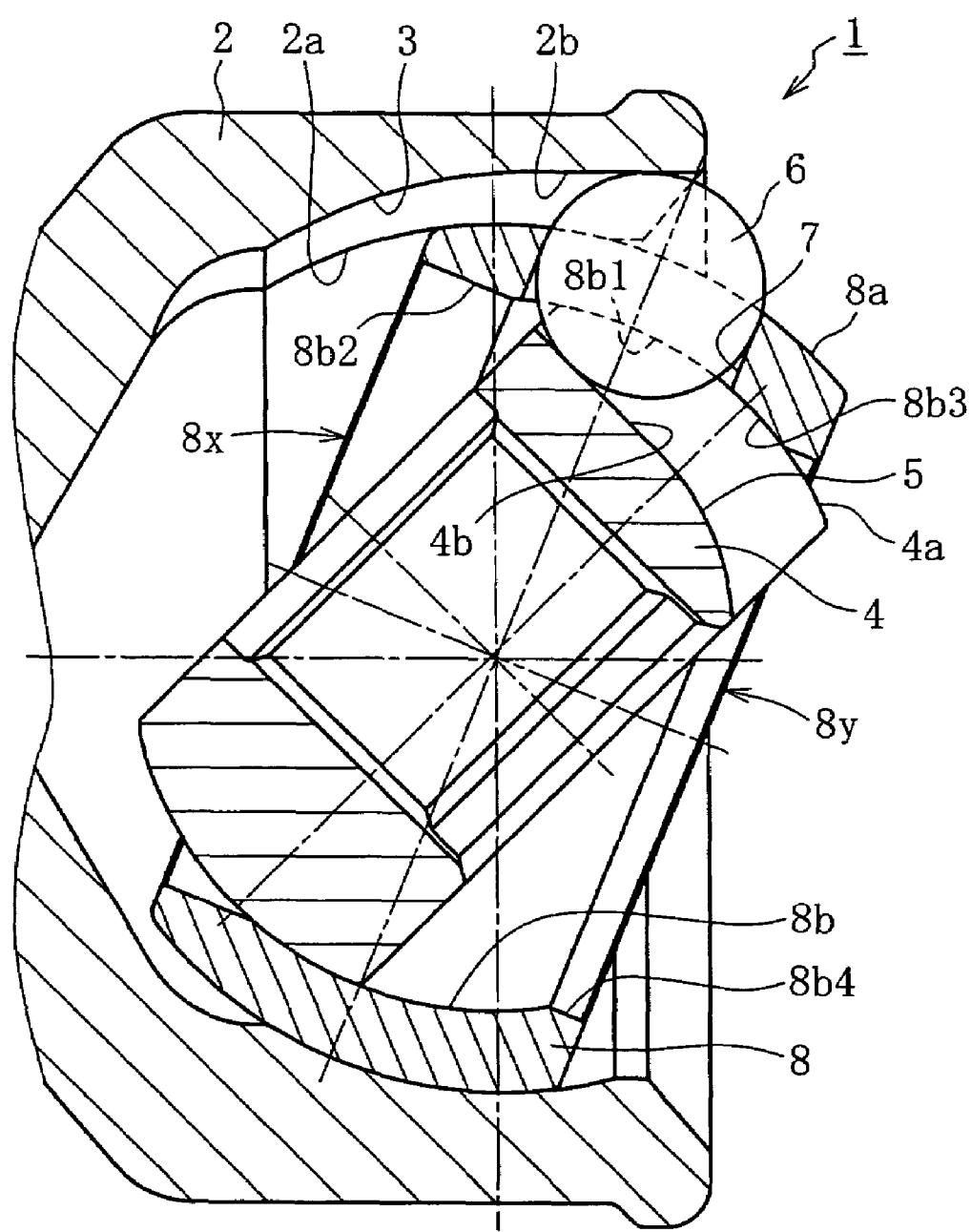
FIG. 2 is a principal front view in longitudinal section, showing a state assumed when a constant velocity joint according to the first embodiment of the invention takes a maximum working angle (for example, 50°)

FIG. 1 illustrates a state assumed when an ATV undercut free type constant velocity joint (UJ) 1 according to an embodiment of the invention takes a working angle θ of 0°. FIG. 2 shows a state assumed when the working angle θ of said constant velocity joint 1 is a maximum working angle (for example, 50°). As shown in these figures, the constant velocity joint 1 comprises an outer joint member 2 (outer ring) with a spherical inner peripheral surface 2a axially formed with a plurality (six or eight) of bottom-curved track grooves 3, an inner joint member 4 (inner ring) with a spherical outer peripheral surface 4a axially formed with a plurality (six or eight) of bottom-curved track grooves 5, a plurality (six or eight) of torque transmitting balls 6 disposed in ball tracks formed by the opposed track grooves 3 and 5 of both joint members 2 and 4, and a cage 8 interposed between both joint members 2 and 4 and receiving and holding the torque transmitting balls 6 in a plurality of window-shaped pockets 7. And, the intermediate shaft 9 of the drive axle (see FIG. 7) is joined to the inner joint member 4 through serrations 4c (or splines) formed in the inner periphery thereof, while a wheel-side member is joined to the stem 2x of the outer joint member 2.

As shown in FIG. 1, the ball track formed from the track groove 3 of the outer joint member 2 and the track groove 5 of the inner joint member 4 exhibits a shape (a wedge shape) which is wide in the inboard side (the right side in the same figure), gradually diminishing toward the outboard side (the left side in the same figure). In this case, the inboard-side region of the track groove 3 of the outer joint member 2, and the outboard-side region of the track groove 5 of the inner joint member 4 are formed with straight sections 2b and 4b, respectively, whose groove bottoms are linear as seen in a longitudinal section. The presence of the straight sections 2b and 4b results in the maximum working angle being set at 50°, which is greater than the conventional passenger car BJ maximum working angle (46.5°).

And, a first feature of the constant velocity joint 1 according to this embodiment is that the diameter Dx of the opening 8x in the end of the cage 8 on the outboard side is set larger than the diameter Dy of the opening 8y in the end on the inboard side, the arrangement being such that the inner joint member 4 can be removably inserted in the cage 8 through the opening 8x on the outboard side. In this case, the diameter Dy of the opening 8y on the inboard side is set small with such a value that the inner joint member 4 cannot be removably inserted in the cage 8.

More specifically, whereas the outer peripheral surface 8a of the cage 8 is spherical substantially over the entire region (the region excluding the chamfered portions of the axial opposite ends), the inner peripheral surface 8b thereof is a spherical surface 8b1 in the axial central region (the region equal to or slightly larger than the axial width of the pocket 7), and the surface continuous with this spherical surface 8b1 is a cylindrical surface 8b2 on the outboard side and is a spherical surface 8b3 on the inboard side. In this case, the cylindrical surface 8b2 on the outboard side continuously extends to the end edge with substantially the same diameter, while the side which is further inboard of the spherical surface 8b3 on the inboard side is continuously formed with a cylindrical surface 8b4 which is smaller in diameter and in axial width than the cylindrical surface 8b2 on the outboard side.

Therefore, the thickness of the cage 8 gradually decreases as the cage extends from the axial central region to the outboard side, but is maintained constant or gradually increases due to cage offset as it extends for a predetermined distance from the axial central region to the inboard side. In other words, the average thickness of the inboard-side region, rather than the axial central region, of the cage 8 is set such that it is greater than the average thickness of the outboard-side region. Further, the area of contact between the inner peripheral surface 8b of the cage 8 and the outer peripheral surface 4a of the inner joint member 4 is set such that it is narrower on the outboard side than on the inboard side. Along with this, the area of contact between the axial opposite sides of the pocket 7 in the inner peripheral surface 8b of the cage 8 and the outer peripheral surface 4a of the inner joint member 4 is set such that it is very narrow on the outboard side but wider on the inboard side than that.

According to the constant velocity joint 1 having said first feature, when it is loaded with torque, the inner peripheral surface 2a of the outer joint member 2 and the outer peripheral surface 8a of the cage 8 contact each other on the inboard side, while the outer peripheral surface 4a of the inner joint member 4 and the inner peripheral surface 8b of the cage 8 contact each other on the outboard side. In this case, on the outboard side of the cage 8, the area of contact with the inner joint member 4 becomes small and the contact pressure increases. With the above setting, since the durability of the contact surfaces against wear and the like will unreasonably not lower, it becomes possible to secure a suitable degree of durability to suppress excessive quality with respect to contact wear and the like on the outboard side of the cage 8.

Furthermore, since a material having a sufficient thickness exists on the inboard side of the cage 8 as compared with such material on the outboard side, even if the force with which the torque transmitting ball 6 jump out to the inboard side acts on the material on the inboard side of the cage 8, the strength against the pressing force becomes sufficient, making it possible to effectively avoid damage and breakage to the cage 8.

In addition, this first feature can be likewise applied not only to the UJ but also to the BJ and also to constant velocity joints for other vehicles than ATVs, (for example, for passenger cars). However, the first feature may be said to be suitable when the durability necessary for ordinary passenger cars leads to excessive quality as in the case of ATVs.

Additionally, in the constant velocity joint 1 according to this embodiment, the inboard-side end of the cage 8 projects from the inboard-side end of the outer joint member 2, whereby the axial width of the cage 8 is made relatively long-sized. Further, the plurality of pockets 7 formed peripherally of the cage 8 at equal intervals are set so that they are all the same in size (the same in axial width and in peripheral length). In addition, the diameter of the spherical inner peripheral surface 2a of the outer joint member 2 and the diameter of the inner peripheral spherical surface 8b of the cage 8 are about 5-10 µm smaller at opposite ends than at the axial center, though not shown, while the diameter of the outer peripheral spherical surface 8a of the cage 8 and the diameter of the spherical outer peripheral surface 4a of the inner joint member 4 are about 5-10 µm larger at opposite ends than at the axial center. Thereby, the inner peripheral surface 2a of the outer joint member 2 and the outer spherical surface 8a of the cage 8 contact each other starting at axial opposite ends, and the inner spherical surface 8b of the cage 8 and the outer peripheral surface 4a of the inner joint member 4 also contact each other starting at axial opposite ends. Therefore, the spherical surfaces making said contact are contacted at two points, and along with this, the position of the spherical section is stabilized.

The center Od of the inner peripheral spherical surface 8b of the cage 8 is offset by a distance Lc taken axially from the joint center O to the outboard side. A cage offset angle φ c consisting of ∠OdQO defined by the center Od of the inner peripheral spherical surface 8b, the center Q of the torque transmitting ball 6, and the joint center O, that is, the offset angle of the inner spherical surface 8b of the cage 8 is set greater than 0° but less than 1° (preferably, 0.50°-0.80°, and in this embodiment, 0.7°). Further, the center Oc of the outer peripheral spherical surface 8a of the cage 8 is offset by the same distance Lc as above taken axially from the joint center O to the inboard side. A cage offset angle consisting of ∠OcQO defined by the center Oc of the outer peripheral spherical surface 8a, the center Q of the torque transmitting ball 6, and the joint center O is also set greater than 0° but less than 1° (preferably, 0.50°-0.80°, and in this embodiment, 0.70°), in the same manner as above.

The center Oa of the track grooves 3 of the outer joint member 2 is offset by a distance La taken axially from the joint center O to the inboard side. From a total offset angle φa consisting of ∠OaQO defined by the center Oa of the track grooves 3 of the outer joint member 2, the center Q of the torque transmitting ball 6, and the joint center O is found the track offset angle of the outer joint member 2, which is φa-φc. This offset angle of the track grooves 3 of the outer joint member 2 is set at 4°-6° (in this embodiment, 5°). Further, the center Ob of the track grooves 5 of the inner joint member 4 is offset by the same distance La as above taken axially from the joint center O to the outboard side, and the track offset angle of the inner joint member 4 found from a total offset angle consisting of ∠ObQO defined by the center Ob of the track grooves 5 of the inner joint member 4, the center Q of the torque transmitting ball 6, and the joint center O is also set at 4°-6° (in this embodiment, 5°), in the same manner as above.

Figure 3:
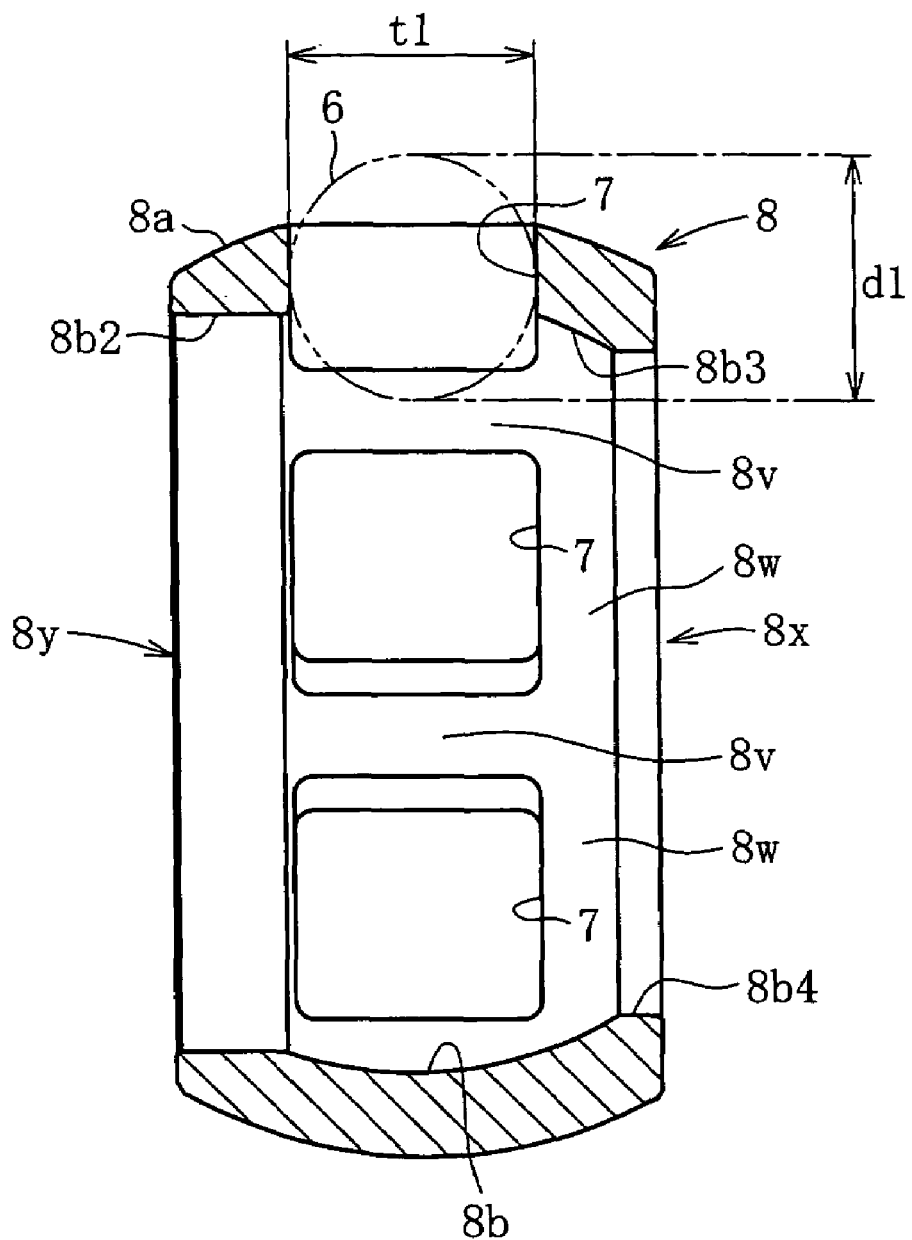
FIG. 3 is a front view in longitudinal section, showing a cage for a constant velocity joint according to the first embodiment of the invention.

In this case, as shown in FIG. 3, the value obtained by subtracting the diameter $d_1$ of the torque transmitting ball 6 from the axial width t1 of the pocket 7 of the cage 8 (before the torque transmitting balls 6 are fitted), that is, the axial pocket clearance δ between the pocket 7 of the cage 8 and the torque transmitting ball 6 is set such that $-30 \ \mu m \leq \delta \leq 0$ µm. More preferably, this axial pocket clearance δ is set such that $-20 \ \mu m \leq \delta \leq 0$ µm. In addition, the torque transmitting balls 6 are fitted in the pockets 7 of the cage 8 in such a manner as to be peripherally slightly movable.

And, this cage 8 is made of such steel as chromium steel (SCr) or chromium molybdenum steel (SCM). The production method thereof, stated roughly, comprises the steps, for example, of forming the basic shape (annulus) of the cage 8 as by press work, effecting window punching for the pockets 7, hardening the cage, and cutting or grinding the portion which was originally the inner peripheral surface (the uncut or unground inner peripheral surface after window punching) of the pockets 7 formed by said window punching, thereby finally obtaining the inner peripheral surfaces of the pockets 7.

Figure 4:
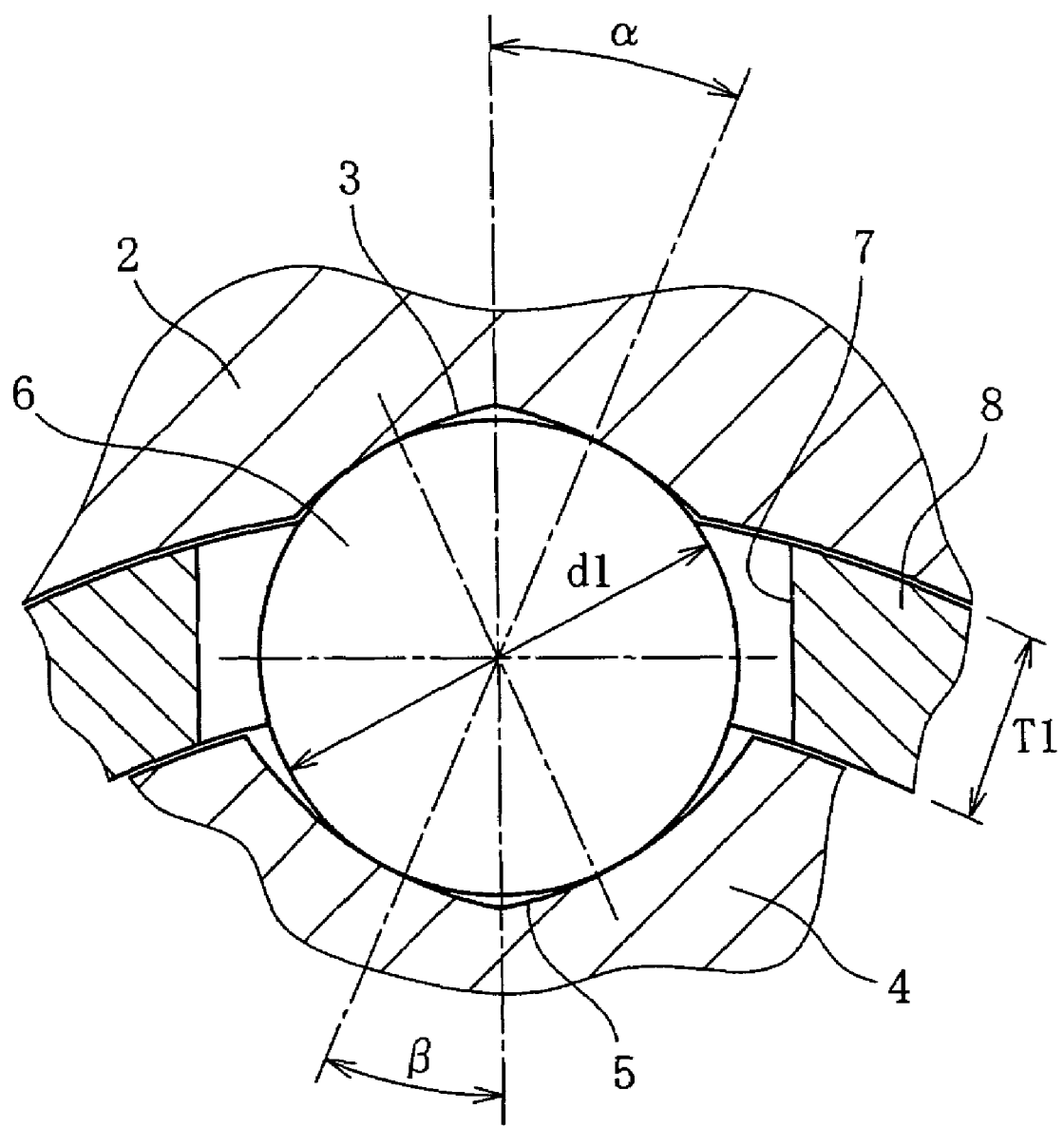
FIG. 4 is a principal enlarged front view in longitudinal section, showing a state assumed when a constant velocity joint according to the first embodiment of the invention takes a working angle of 0°.

The second feature of the constant velocity joint 1 according to the embodiment is that in addition to the above arrangement, the ratio of the dimensions of constituent elements is set as shown below. That is, dw/dv is set at 3.3-3.6, where, as shown in FIG. 1, dw is the diameter of the outer peripheral surface of the outer joint member 2, dv is the PCD of the serrations 4c (or splines) of the inner joint member 4. Further, as shown in FIG. 4, that is, as shown in the principal enlarged side view in longitudinal section of the constant velocity joint 1, T1/d1 is set at 0.33-0.35, where T1 is the material thickness of the cage 8 (the material thickness of the axial center) and d1 is the diameter of the torque transmitting ball 6. Further, the contact angle α of the track grooves 3 of the outer joint member 2 with respect to the torque transmitting balls 6 and the contact angle β of the track grooves 5 of the inner joint member 4 with respect to the torque transmitting balls 6 are set so that both are 31.5°-38.5° (preferably, 35°).

In addition, the value obtained by dividing the diameter of the outer peripheral surface 8a of the cage 8 by the diameter $d_1$ of the torque transmitting balls 6 is set at 3.8-3.9, the diameter of the inner peripheral surface 8b of the cage 8 by the diameter $d_1$ of the torque transmitting balls 6 is set at 3.13-3.23, and the value obtained by dividing the diameter of the inner peripheral surface 8b of the cage 8 by the diameter of $d_1$ of the torque transmitting ball 6 is set at 1.9-2.0.

According to the constant velocity joint 1 having the second feature as described above, since dw/dv obtained by dividing dw which is the diameter of the outer peripheral surface of the outer joint member 2 by dv which is the is the PCD of the serrations 4c of the inner joint member 4 is set at 3.3-3.6 (see FIG. 1), the value of dw/dv becomes smaller than the conventional value (about 3.7). Thereby, the region extending from the outer peripheral surface of the outer joint member 2 to the inner peripheral end of the inner joint member 4 become relatively small as compared with that in the prior art, making it possible to attain relative size and weight reductions of the constant velocity joint 1 in connection with the intermediate shaft 9. More specifically, the outer and inner joint members 2 and 4 and the torque transmitting balls 6 are selectively suitably reduced in size to avoid their excessive quality, so that even in the case where the design concept of making the material thickness of the cage 8 greater than in the prior art to improve the strength is employed, as a whole, relative size and weight reductions in relation to the intermediate shaft 9 can be attained.

Further, since the value of T1/d1 obtained by dividing the material thickness T1 of the cage 8 by the diameter d1 of the torque transmitting ball 6 is set at 0.33-0.35 (see FIG. 4), the value of T1/d1 becomes greater than the conventional value (about 0.25). Thereby, the material thickness T1 of the cage 8 becomes relatively greater in relation to the diameter d1 of the torque transmitting balls 6, so that even in the case where the pressing force from the torque transmitting ball 6 acts on the peripheral material section of each of the pockets 7 of the cage 8, cracks or damage hardly occurs in the material section between pockets 7 of the cage 8 (the material section indicated by the reference character 8v in FIG. 3) or in the material sections on axial opposite sides of each pocket 7 (the material sections indicated by the reference character 8w in FIG. 3). As a result, the strength of the cage 8 and also the strength of the constant velocity joint 1 effectively improves.

Further, since the contact angle α of the track grooves 3 of the outer joint member 2 with respect to the torque transmitting balls 6 and the contact angle β of the track grooves 5 of the inner joint member 4 with respect to the torque transmitting balls 6 are set so that both are 31.5°-38.5° (preferably, 35°), even in the case where the track grooves 3 and 5 of the outer and inner joint members 2 and 4, respectively, become shallower due to increasing the thickness T1 of the cage 8, since the contact angles α and β of the torque transmitting balls 6 with respect to the track grooves 3 and 5 are made small as compared with the conventional contact angle (40°-45°), it becomes possible to suppress an increase in the percentage of risk of the torque transmitting balls 6 running up onto the shoulder.

Figure 5:
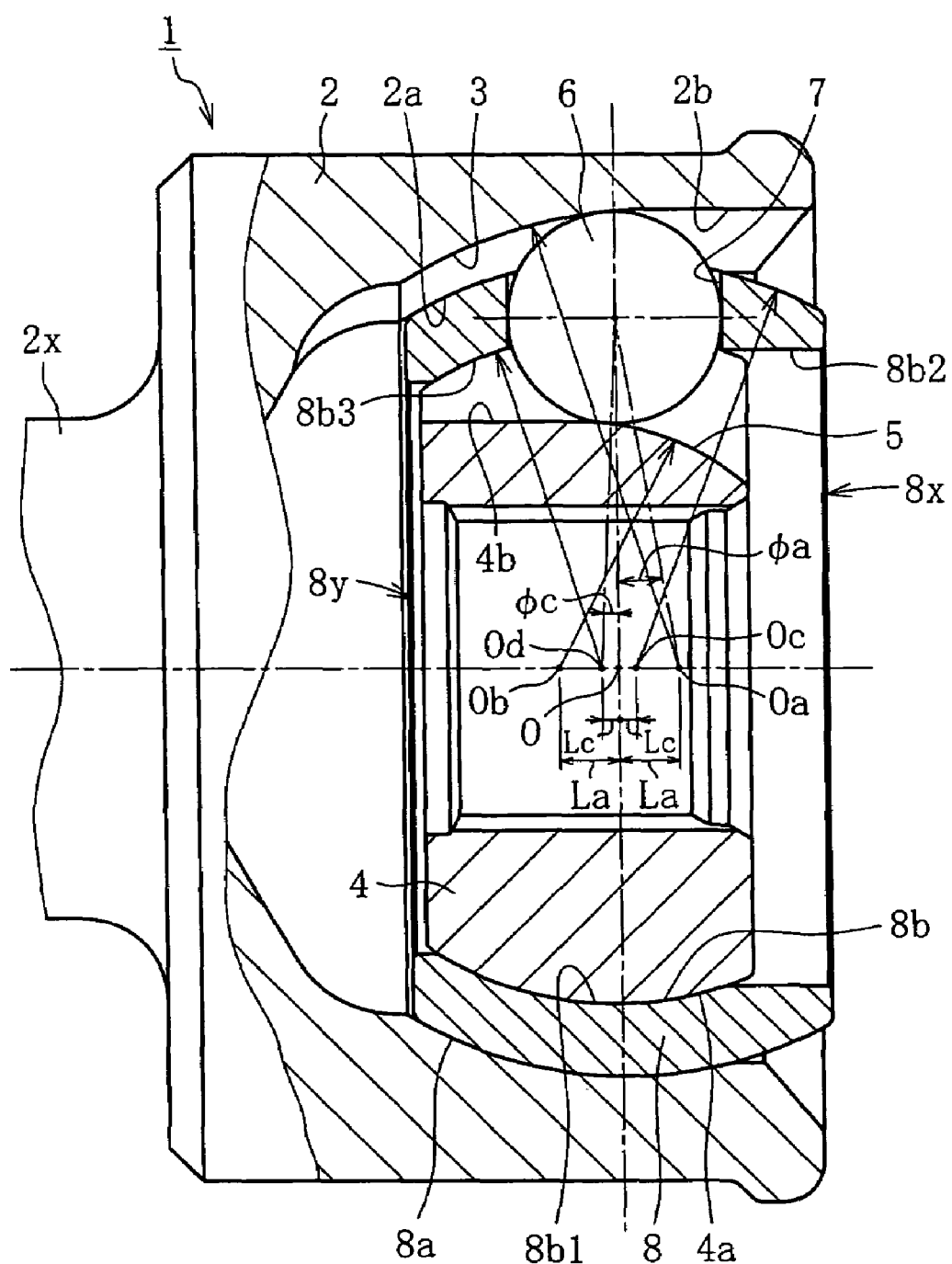
FIG. 5 is a principal front view in longitudinal section, showing a state assumed when a constant velocity joint according to a second embodiment of the invention takes a working angle of 0°.

Further, the constant velocity joint 1 having the second feature may be arranged as shown in FIG. 5. FIG. 5 shows the arrangement of the constant velocity joint 1 when the working angle θ is 0°. The difference of the constant velocity joint 1 shown in FIG. 5 from the constant velocity joint 1 already described with reference to FIGS. 1-4 is that the cage 8 is axially reversely incorporated, that is, the relatively large diameter opening 8x in the cage 8 is positioned on the inboard side and the relatively small diameter opening 8y is positioned on the outboard side. The rest of the arrangement is the same as in the constant velocity joint 1 already described. Therefore, in FIG. 5, constituent elements common to both are given the same reference characters to omit a description thereof. And, with the constant velocity joint 1 shown in FIG. 5, the same effects as those of the constant velocity joint 1 having the second feature can be obtained.

In addition, this second feature can be likewise applied to vehicles other than ATVs, provided that the vehicle allows balance between strength and durability.

What is claimed is:

1. A constant velocity joint comprising:
   an outer joint member disposed on the outboard side of a drive axle for transmitting drive power to a wheel and having a plurality of track grooves in a spherical inner peripheral surface thereof,
   an inner joint member having a plurality of track grooves in a spherical outer peripheral surface thereof,
   torque transmitting balls disposed in a plurality of ball tracks formed by the opposed track grooves of both joint members, and
   a cage interposed between both joint members and receiving and holding said torque transmitting balls in a plurality of window-shaped pockets,
   wherein the track groove of said outer joint member has an inboard side with a linear form and an outboard side with a curved form;
   the track groove of said inner joint member has an inboard side with a curved form and an outboard side with a linear form;
   an opening formed at the outboard side of said cage has a larger diameter than an opening formed at the inboard side;
   a thickness of the inboard side of said cage is larger than a thickness of the outboard side thereof; and
   a total of six torque transmitting balls are respectively accommodated in the pockets of said cage.

2. The constant velocity joint as set forth in claim 1, wherein the outer peripheral surface of the cage is a spherical surface substantially over the entire region, while an inner peripheral surface of the cage is configured such that the surface continuous with the spherical surface of the axial central region is a cylindrical surface on the outboard side and is a spherical surface on the inboard side.

3. The constant velocity joint as set forth in claim 2, wherein the inboard-side end of the cage projects from the inboard-side end of the outer joint member, in the state of the working angle being 0°.

4. The constant velocity joint as set forth in claim 3, wherein the plurality of window-shaped pockets of the cage are formed so that they are all the same in size.

5. The constant velocity joint as set forth in claim 4, wherein the constant velocity joint is of an undercut free type.

6. The constant velocity joint as set forth in claim 5, wherein the constant velocity joint is installed in an uneven terrain traversing mounted type vehicle.

7. The constant velocity joint as set forth in claim 2, wherein the plurality of window-shaped pockets of the cage are formed so that they are all the same in size.

8. The constant velocity joint as set forth in claim 1, wherein the inboard-side end of the cage projects from the inboard-side end of the outer joint member, in the state of the working angle being 0°.

9. The constant velocity joint as set forth in claim 8, wherein the plurality of window-shaped pockets of the cage are formed so that they are all the same in size.

10. The constant velocity joint as set forth in claim 1, wherein the plurality of window-shaped pockets of the cage are formed so that they are all the same in size.

11. The constant velocity joint as set forth in claim 1, wherein the inner joint member is provided directly on an intermediate shaft on an inboard side of the drive axle.

12. An undercut free type constant velocity joint comprising:
    an outer joint member disposed on the outboard side of a drive axle for transmitting drive power to a wheel and having a plurality of track grooves in a spherical inner peripheral surface thereof,
    an inner joint member having a plurality of track grooves in a spherical outer peripheral surface thereof,
    torque transmitting balls disposed in a plurality of ball tracks formed by the opposed track grooves of both joint members, and
    a cage interposed between both joint members and receiving and holding said torque transmitting balls in a plurality of window-shaped pockets,
    wherein a total of six torque transmitting balls are respectively accommodated in the pockets of said cage, and
    wherein dw/dv is set at 3.3-3.6, where dw is a diameter of the outer peripheral surface of said outer joint member and dv is a pitch circle diameter (PCD) of serrations or splines formed on an inner periphery of said inner joint member and used for joining to a shaft member.

13. The constant velocity joint as set forth in claim 12, wherein T1/d1 is set at 0.33-0.35, where T1 is the material thickness of the cage at the axial center of the cage and d1 is the diameter of the torque transmitting balls.

14. The constant velocity joint as set forth in claim 13, wherein the contact angle α of the track grooves of the outer joint member with respect to the torque transmitting balls and the contact angle β of the track grooves of the inner joint member with respect to the torque transmitting balls is set so that both are 31.5°-38.5°.

15. The constant velocity joint as set forth in claim 14, wherein the inboard-side end of the cage may project from the inboard-side end of the outer joint member, in the state of the working angle being 0°.

16. The constant velocity joint as set forth in claim 14, wherein the plurality of window-shaped pockets of the cage are formed so that they are all the same in size.

17. The constant velocity joint as set forth in claim 16, wherein the joint is installed in an uneven terrain traversing, mounted type vehicle.

18. The constant velocity joint as set forth in claim 13, wherein the inboard-side end of the cage may project from the inboard-side end of the outer joint member, in the state of the working angle being 0°.

19. The constant velocity joint as set forth in claim 12, wherein the contact angle α of the track grooves of the outer joint member with respect to the torque transmitting balls and the contact angle β of the track grooves of the inner joint member with respect to the torque transmitting balls is set so that both are 31.5°-38.5°.

20. The constant velocity joint as set forth in claim 19, wherein the inboard-side end of the cage may project from the inboard-side end of the outer joint member, in the state of the working angle being 0°.

21. The constant velocity joint as set forth in claim 12, wherein the inboard-side end of the cage may project from the inboard-side end of the outer joint member, in the state of the working angle being 0°.

22. The constant velocity joint as set forth in claim 12, wherein a cylindrical inner surface of the cage extending to the outboard side edge is parallel to a straight section of the outer peripheral surface of the inner joint member.

23. The constant velocity joint as set forth in claim 12, wherein the inner joint member is provided directly on an intermediate shaft on an inboard side of the drive axle.

* * * * *